United States Patent [19]

Morita

[11] 4,068,303

[45] Jan. 10, 1978

[54] ADDRESS TRANSLATION MANAGING SYSTEM WITH TRANSLATION PAIR PURGING

[75] Inventor: Hiroshi Morita, Isehara, Japan

[73] Assignee: Hitachi, Ltd., Japan

[21] Appl. No.: 668,836

[22] Filed: Mar. 22, 1976

[30] Foreign Application Priority Data

Mar. 24, 1975 Japan .................................. 50-34457

[51] Int. Cl.² .......................... G06F 9/20; G06F 13/00
[52] U.S. Cl. .................................................... 364/200
[58] Field of Search ...................... 340/172 S; 364/200

[56] References Cited

U.S. PATENT DOCUMENTS

3,588,839  6/1971  Belady ............................... 340/172 S
3,902,163  8/1975  Amdahl .............................. 340/172 S Primary Examiner—James D. Thomas
Attorney, Agent, or Firm—Craig & Antonelli

[57] ABSTRACT

In a data processing system employing a virtual storage system, a plurality of address translation pairs each consisting of a logical address in a virtual storage space and a real address in a real storage space, are registered in a buffer storage device to swiftly translate a logical address into the corresponding real address. According to this invention, in the case of purging a virtual space out of multiple virtual spaces only the address translation pairs corresponding to the virtual space are purged so that the processing performance of the data processing system can be improved.

9 Claims, 7 Drawing Figures

FIG. 1

| LOGICAL STORAGE ADDRESS | REAL STORAGE ADDRESS | ID | V | |
|---|---|---|---|---|
| VSA 1 | RSA 1 | 01 | 0 | ← |
| VSA 2 | RSA 2 | 00 | | |
| VSA 3 | RSA 3 | 11 | | |
| VSA 4 | RSA 4 | 01 | 0 | ← |
| VSA 5 | RSA 5 | 01 | 0 | ← |
| VSA 6 | RSA 6 | 10 | | |
| VSA 7 | RSA 7 | 00 | | |
| VSA N | RSA N | 11 | | |

| ID | TABLE BASE STACK |
|---|---|
| 00 | STO 2 |
| 01 | STO 3 |
| 10 | STO 5 |
| 11 | STO 1 |

STO 3
TBR

FIG. 2

| 0        7 8 | 15 16 | 19 20 | 31 |
|---|---|---|---|
| OPERATION CODE F | VARIATION I | GENERAL REGISTER SELECTION $B_1$ | DISPLACEMENT $D_1$ |

ADDRESS TRANSLATION MANAGING SYSTEM WITH TRANSLATION PAIR PURGING

BACKGROUND OF THE INVENTION

1. Field of the Invention

The present invention relates to an address translation system in a data processing system employing a virtual storage system, and more particularly to the control of purging the address translation pairs set in some buffer registers, which translates virtual addresses into real addresses, especially in the case where the users' space is shared by a plurality of tasks.

2. Description of the Prior Art

In the case where many programs must be processed by a single data processing system, it may happen that the capacity of the main memory of the data processing system is insufficient for all the programs. The conventional method for dealing with such a case is to store most of the programs in an external memory such as a magnetic tape or disc and to store only a few of them in the main memory. In this method, therefore, the frequent transfer of data between the main memory and the external memory is necessary. It is preferable in such a data processing system that each program is divided into segments while each segment is split into pages. Accordingly, the data page consisting of a certain number of bytes is the smallest unit relocated between the main memory and the external memory. Each segment and each page have their own symbolic addresses called "logical addresses". In case where such logical addresses are used, they have to be translated into real addresses in the main memory.

A central processing unit (referred to also as CPU) can access only real addresses and when data is not yet transferred from the external memory to the main memory, the mapping fault is detected by the address translation table, an interruption is generated and the data transfer from the external memory to the main memory takes place. The transfer of data from the external memory serving as the virtual storage space to the main memory serving as the real storage space is performed page by page. If in this case the main memory has no vacant area in which the data from the external memory is to be stored, the pages which went out of use or are only rarely used, are returned to the external memory to create vacant areas in the main memory and new data is transferred from the external memory and stored in the vacant areas. The operation of transferring a part of the data in the external memory to the main memory is called "roll in" or "swap-in" and the reverse operation is called "roll out" or swap-out". Both the operations are generically called "swapping".

Moreover, in order to reduce the time required for address translation, translation pairs each consisting of a virtual address and a real, i.e. translated, address are registered in a translation lookaside buffer (referred to also as TLB). Especially, in order to improve the processing efficiency of the data processing system, the TLB can be shared by plural virtual storage spaces. Namely, in a central processing unit (CPU) processing a task A by using a virtual storage space, each entry of the TLB corresponding to the task A has not only the address translation pair of a virtual and a real address relevant to the virtual space but also an identification flag for identifying the task A. When the task A is switched to a task B by some cause or other as the program process proceeds, the address translation pairs for the task A are left as they are in the TLB and the task B is processed in accordance with a similar program process. New address translation pairs may be registered in the TLB, if necessary. If the task A is again required to be processed, the flag for identifying the task A, remaining in the TLB, is referred to and the real address in the entry having the flag for the task A is directly used to shorten the translation time. In order to discriminate the tasks A, B and so on, there is provided a table base stack consisting of plural registers for storing an origin address of address translation tables used for a task. Each task has a different table origin address. The position of respective registers storing the different origin address is used as the task identification flag in the TLB.

When the processings of all the tasks are completed or when the task went out of use, the corresponding virtual space is eliminated, and then the translation pairs of TLB which is used for the task are to be also eliminated. In this case, all the contents of the TLB are eliminated or the translation pairs used for the processing of the tasks are eliminated page by page.

In the multiprocessor system in which plural CPU's share a main memory, besides the above described operations, when a CPU is subjected to swapping out, it interrupts the remaining CPU's through direct control so as to communicate with the remaining CPU's or the address data of its areas to be swapped out is stored in the specific address in the main memory so that the other CPU's refer to the specific address to purge only corresponding ones of all their translation pairs.

However, as the address translation pairs used by a task increase in number, the program steps for eliminating a virtual space or swapping out also increase or too long a time is required to eliminate page by page the address translation pairs registered in the TLB. Furthermore, in a multiprocessor system, every swap-out operation of one CPU accompanies such influences upon the other CPU's as the external interruptions to the other CPU's or the references of the specific address in the main memory by the other CPU's. Therefore, the processing time is prolonged and the processing efficiency is lowered.

SUMMARY OF THE INVENTION

One object of the present invention is to provide a data processing system employing a virtual storage system, which can process a program for eliminating a virtual space with high efficiency and speed and without the degradation of processing efficiency for any other virtual spaces.

Another object of the present invention is to provide an address translation system which can purge only that part of address translation pairs registered in the TLB which corresponds to a virtual space.

Yet another object of the present invention is to provide a data processing system employing a multiprocessor system wherein plural processors share the main memory, in which when some address translation pairs, which correspond to a virtual space and are registered in the TLB of a processor are purged, each of the other processors purges only the address translation pairs, which correspond to the virtual space and have been registered in its own TLB.

The address translation system according to the present invention employs a virtual storage system and incorporates therein a translation lookaside buffer (TLB) in which address translation pairs each consisting of a virtual address and a real address, are registered. This address translation system further comprises a plurality of registers which respectively stack base addresses characteristic of individual virtual spaces. The address translation pairs registered in the TLB are provided respectively with the flags for showing the correspondences to the registers. In case of purging an address translation pair, the registers are subjected to searching while the flags are sequentially referred to, so that only the translation pairs corresponding to a virtual space are purged.

Further, in a multiprocessor system in which plural processors share the main memory, each processor has such a TLB and registers as mentioned above. And when an address translation pair in the TLB of a processor is purged, the same translation pairs in the other processors are also purged without any influence on virtual spaces of the other processors.

Therefore, according to the address translation system embodying the present invention, only those address translation pairs which correspond to a virtual space, can be purged from the TLB so that the degradation of processing efficiency can be prevented with the processing efficiency degradation being caused by the conventional address translation system which eliminates a useless address translation pair page by page or purges at one operation all the translation pairs in the TLB.

DESCRIPTION OF THE PREFERRED EMBODIMENTS

The gist of the present invention is not the electronic circuits for an electronic computer nor the structures of elements used in the circuits, but the combination of them and the method of operation. Accordingly, the circuits and the associated elements used in this invention are conventional ones and these are represented by boxes and diagrams.

Figure 1:
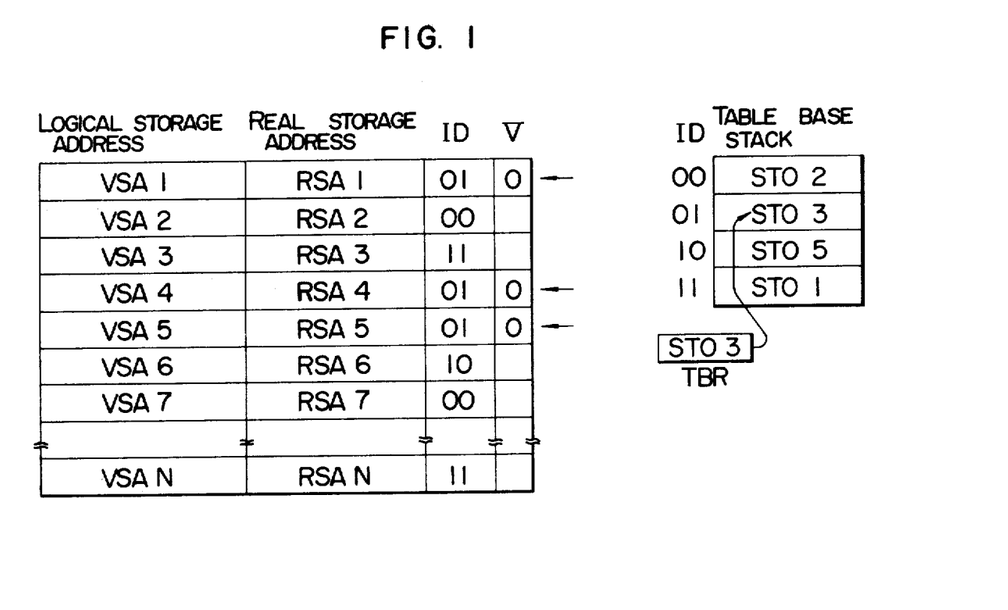
FIG. 1 illustrates the basic concepts of the present invention.

FIG. 1 is a schematic view for illustrating the procedure of partially purging certain address translation pairs out of a TLB in the present invention. The TLB is provided just to reduce the time required for an address translation. The TLB is provided with N entries, usually 16 to 256 entries. In each entry is registered a pair of a logical address and a translated, i.e. real, address. In addition each entry has an identification part (referred to hereafter as ID part) and a validity bit part (hereafter referred to as V part). The ID part serves to make the registers of a table base stack described later associated with the entries of the TLB. The V part of each entry of the TLB is a bit indicating whether the translation pair of virtual and real addresses stored in the entry is valid or invalid. If the V part of an entry is "1", the corresponding address translation pair is valid. If on the other hand the V part is "0", the address translation pair is not valid. Of course, the roles of "1" and "0" may be interchanged. In such a case, the address translation pair will be valid for "0" and invalid for "1". The table base stack consists of plural, e.g. four, registers, each of which stores a base address characteristic of a virtual space. It is apparent that the number of the registers comprised by the table base stack is not limited to four, but that eight, 16, ... 256, and usually N registers can be used in other examples. Each register of the table base stack is provided with its own identification part (ID part). As shown in FIG. 1, the ID's are "00", "01", "10" and "11". Through the coincidence between the ID's of the registers and the ID's of the entries of the TLB, the base addresses of virtual spaces stored in the registers are associated with the translation pairs in the entries. If it is assumed that a processor treats six different tasks, the tasks correspond to six different virtual storage spaces. Each virtual storage space usually has a well-known segment size and the base address of the virtual storage space is the origin address of the segment table. Such different base addresses are registered respectively in the registers of the table base stack. The base addresses registered are represented by ST0, ST1, ... , ST5. On the other hand, the entries of the TLB stores the translation pairs each consisting of a virtual address and a real address, which are related to the base addresses registered in the registers of the table base stack by virtue of the ID's.

Now, the description will be made of the case where any one of the translation pairs stored in the TLB corresponding to a certain virtual storage space is purged. First, a base address, e.g. ST03, characteristic of a virtual storage space is set in the table base register (referred to as TBR). The base addresses registered in the registers of the table base stack are searched with respect to the base address set in the TBR. If there is a coincidence between the set base address and any one stored in the table base stack, the number, e.g. "01", characteristic of the register storing the base address is delivered. Then, the ID parts of the entires of the TLB are subjected to sequential searching with respect to "01". If there is in the TLB an entry which has the ID part "01", the translation pair in the entry is purged and "0" is written in the V part of the entry. In this way, only those of the entries in the TLB which correspond to the virtual storage space can be purged.

The present invention relates to how to purge a part of address translation pairs each consisting of a virtual address and a real address and stored in each entry of the TLB, but not to how to register the address translation pairs in the entries of the TLB. According to the present invention, instructions are provided to purge a part of the entries of the TLB. Such instructions are referred to as "PTLB instruction" (Purge TLB by Table Base Address).

Figure 2:
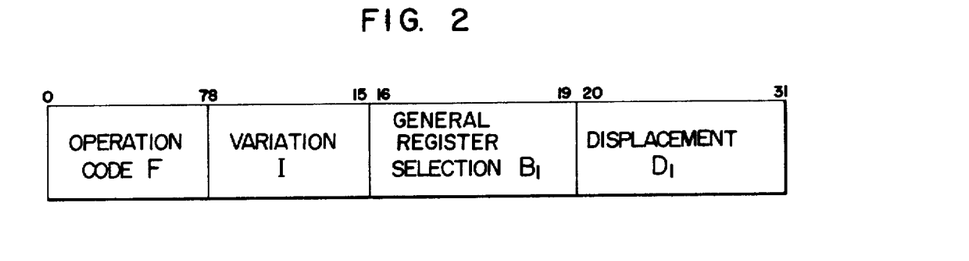
FIG. 2 shows the format of an instruction used in the present invention.

FIG. 2 shows the format of such an instruction. The instruction consists of 32 bits; 1st group consisting of 8 bits, bit 0 - bit 7, corresponding to the operation code (F), 2nd group consisting of 8 bits, bit 8 - bit 15, to variation (I), 3rd group consisting of 4 bits, bit 16 - bit 19, to the general register selection ($B_1$), and 4th group consisting of 12 bits, bit 20 - bit 31 to the displacement ($D_1$) of the operand. This instruction has the same format as that processed usually by a processor. The PTLB instruction according to the present invention is defined by the hexadecimal representation "8104" which is formed of 16 bits, bit 0 - bit 15, i.e. operation code (F) and variation (I). It should be noted here that the numbers of bits constituting an instruction and any segment of the instruction is not limited to those shown in FIG. 2, but that the format shown in FIG. 2 is used for the sake of convenience in the description of the embodiment of the present invention.

The detailed description of the address translation system according to this invention will now be made with the aid of FIG. 3.

A TLB 1 consists of 128 entries, each of which comprises a logical address (L), a real address (R), a table base stack identification (ID) and a validity bit (V). As well known, an address translation pair consists of a logical address in the virtual storage space and a real address in the main memory (referred to also as MM). The ID is constituted of two bits and serves to relate the address translation pairs in the TLB 1 to the corresponding registers of the table base stack 8 described later. The table base stack 8 has four registers each of which is furnished with its own number such as "00", "01", "10" or "11". These numbers are to be set in the ID parts of the entries of the TLB 1. The V part indicates whether the translation pair of a logical address and a real address in the associated entry is valid or invalid. If $V_i$ = "1", The $i$-th translation pair is valid and if $V_i$ = "0", it is invalid.

A decoder 2 selects one of the entries of the TLB. In the selected entry a new address translation pair can be registered or the address translation pair already registered can be made invalid. The decoder 2 receives as its input a signal from a counter 3 as well as the bits No. 13 – No. 19 from an address register 10. The address register 10 consists of 32 bits. Of the 32 bits, the upper 13 bits are set in the logical address section of the TLB 1 and simultaneously sent to a comparator 11. The lower 12 bits of the content of the address register 10 serve as the lower address of a real address register 12 and the 12 bits read out of the real address section of the TLB 1 form the upper address of the real address register 12. The real address completed in the real address register, consisting of the 12-bit upper address and the 12-bit lower address, is used to access the main memory.

The comparator 11 compares the logical address read out of the logical address section of the TLB 1 with the upper 13 bits of the address register 10. Only when the coincidence is obtained in the above comparison, the V part of the entry under consideration of the TLB 1 is "1" and the signal line 31 is energized, an AND gate 36 is opened to send a signal to an address translation circuit (not shown).

The registration of the real addresses from the main memory into the real address section of the TLB 1 is performed through the line 21.

The above process of registering the logical and real addresses in the TLB 1 is not characteristic of the present invention, but is one of the conventional methods.

The table base stack 8 consists of four registers 8-1, 8-2, 8-3 and 8-4. The number of the registers is determined here only for the sake of convenience and by no means limited to four. The registers of the table base stack 8 stores base addresses corresponding respectively to different virtual storage spaces. The registers 8-1, 8-2, 8-3 and 8-4 are provided with their own identification numbers "00", "01", "10" and "11", respectively. These numbers are hereinafter referred to as "stack numbers". These stack numbers "00", "01", "10" and "11" make the translation pairs in the entries of the TLB 1 correspond to the base addresses stored in the registers of the table base stack 8, i.e. the virtual storage spaces symbolized by the base addresses. To make the correspondence, the stack numbers characteristic of the registers of the table base stack 8 have only to be set into the ID parts of the entries of the TLB 1.

Usually, each time a task is switched to other task in a processor (or central processing unit), an instruction causes the origin address of the address translation table in the main memory to be read out through a line 21 and to be set in a table base register (referred to also as TBR) 6. At the same time, the origin address is also registered through a line 25 in one of the registers of the table base stack 8. The order of registration is sequential, that is, the register 8-1 is initially occupied and the registers 8-2, 8-3 and 8-4 are operated in this order mentioned. The registers may also be operated according to any other order. If it is assumed that a base address is registered in the register 8-1, the stack number "00" of the register 8-1 is set in a stack number register 7 through a comparator 9 and a line 27. As to the TLB 1, on the other hand, just when translation pairs are stored in certain entries of the TLB 1, the content of the stack number register 7 is set in the ID part of each of the above-mentioned entries. This assures the correspondence between the address translation pairs in the TLB 1 and the base addresses in the table base stack 8, i.e. between the address translation pairs in TLB 1 and the task.

The comparator 9, though not described in detail, is constituted of conventional encoders and gates in combination. The comparator 9 compares bit by bit the output of the gate 15 with the outputs read sequentially out of the registers 8-1, 8-2, 8-3 and 8-4 of the table base stack 8. The registration of a stack number in the ID part of the proper entry of the TLB 1 is performed by making the output of the TBR 6 valid and sending the valid output to the comparator 9 through the gate 15, by comparing the valid output with the base addresses read sequentially out of the registers of the table base stack 8 and energizing the line 27 at coincidence, and by setting the coincident stack number in the stack number register 7 and registering the stack number in the ID part of the corresponding entry of the TLB 1 through a line 28.

The purging of those address translation pairs of TLB 1 which belong to a virtual space is performed as follows. The output of the address register 10 is sent through a line 23 and the gate 15 to the comparator 9 and the output is compared there with the outputs of the registers of the table base stack 8. If there is a coincidence, the stack number of the register whose output made the coincidence is delivered through a line 26 to the gate 14, which also receives the output of the stack number register 7. Only one of the signal on the line 26 and the signal from the stack number register 7 are passed through the gate 14 and sent to a comparator 13. The comparator 13 also receives the numbers read out of the ID parts of the entries of the TLB 1. The numbers read out of the ID parts are sent through a line 30, temporarily stored in a register 35 and further sent through a line 33 to the comparator 13. In case of reading the identification numbers out of the ID parts of the TLB 1, the decoder 2 selects any one of the entries of the TLB 1 in accordance with the output of the counter 3 and the ID part of the selected entry delivers an output. Accordingly, the entires of the TLB 1 are sequentially selected by sequentially renewing the count of the counter 3 as many times as the number of the entries, i.e. 128. As the entries are sequentially selected, the stack numbers in the ID parts of the corresponding entries are delivered to the line 30 and temporarily set in the register 35. The stack numbers sent through the gate 14 and the line 29 in an operation manner of the gate 14 that a signal on the line 26 is made valid and the stack numbers sent from the register 35 via the line 33 are successively compared with each other in the comparator 13. The comparison operations take place 128 times. If a coincidence is found, the line 31 is energized and "0" is written in the V part of the entry of the TLB the stack number of which made the coincidence, so that the address translation pair of the very entry is purged.

An instruction processing circuit 5 serves to process the instructions in a central processing unit CPU. The details of the instruction processing circuit 5 are shown in FIG. 4.

A control circuit 4 serves to control the PTLB instructions. The control circuit 4 performs the control of PTLB instruction according to microprograms. The sequence of this control is shown in terms of flow chart in FIG. 6. The control circuit 4 is connected with the instruction processing circuit 5 through lines 16, 17 and 18. Of these lines the line 18 is used only when the address translation system is applied to a multiprocessor system. The control circuit 4 is also connected through lines 41 and 42 with other CPU's and further with the counter 3 so as to renew the value of the counter 3.

Figure 4:
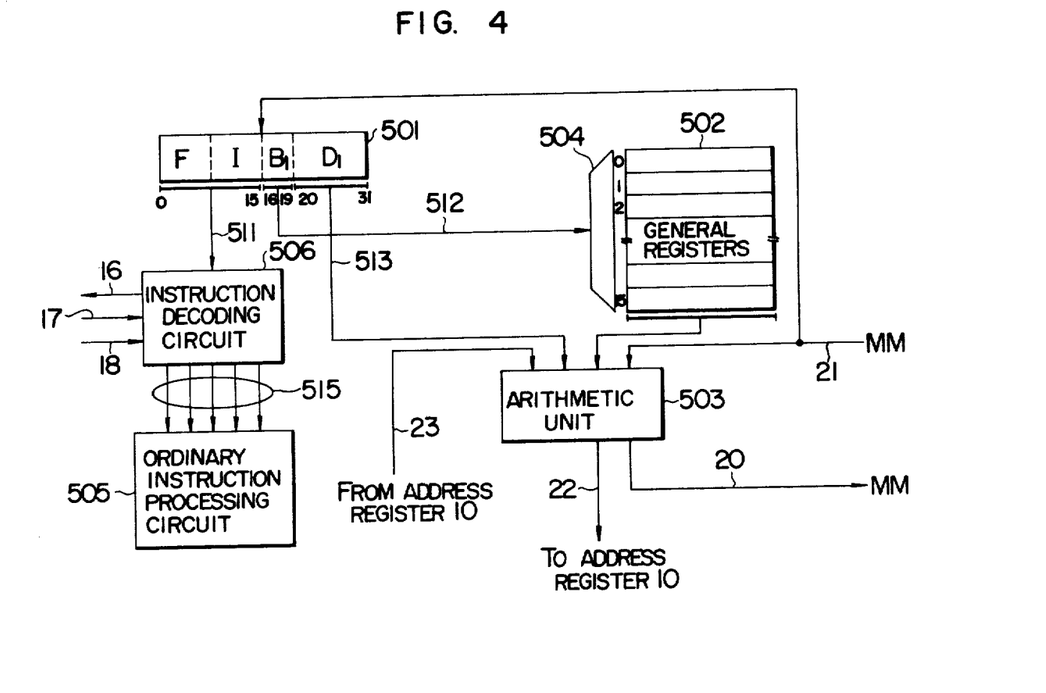
FIG. 4 shows the details of the instruction processing circuit used in the present invention.

FIG. 4 shows the details of the instruction processing circuit 5. An instruction register 501 has 32 bits and stores the PTLB instruction read out of the main memory MM. The instruction register 501 also stores the ordinary instructions when they are performed. Namely, the instruction having such a format as shown in FIG. 2 is set in the instruction register 501. The content of the instruction register 501 consists of an operation code part (F), a variation part (I) for selecting the register numbers, a general register selection part ($B_1$) and a displacement part ($D_1$) of operand. The 16 bits composed of the F part and the I part are sent through a line 511 to an instruction decoding circuits 506. The 4 bits of the $B_1$ part is sent through a line 512 to a decoder 504. The decoder 504 selects any one of general registers 502. The output of any selected register 502 is put in an arithmetic unit 503. The arithmetic unit 503 also receives the data sent from the MM through the line 24. The line 24 is connected with the real address section of the TLB 1 so as to register real addresses therein. The 12 bits of the $D_1$ part of the instruction register 501 is sent through a line 513 and put in the arithmetic unit 503 while the data from the address register 10 is sent to the arithmetic unit 503 through a line 23. The output of the arithmetic unit 503 is applied through a line 22 to the address register 10 and through a line 20 to the MM.

The instruction decoding circuit 506 is constituted of conventional decoders and gates in combination and therefore is not a novel circuit. The instruction decoding circuit 506 is connected through the line 16, 17 and 18 with the control circuit 4. When the combination of the F and I parts forms "8104" in hexadecimal representation, the PTLB instruction is obtained as a result of decoding so that the line 16 is energized. The line 17 is for the signal indicating that the processing of the PTLB instruction has been completed. The line 18 serves to conduct a PTLB instruction from another CPU. The output of the instruction decoding circuit 506 is sent through lines 515 to an ordinary instruction processing circuit 505.

DESCRIPTION OF OPERATION

Figure 6:
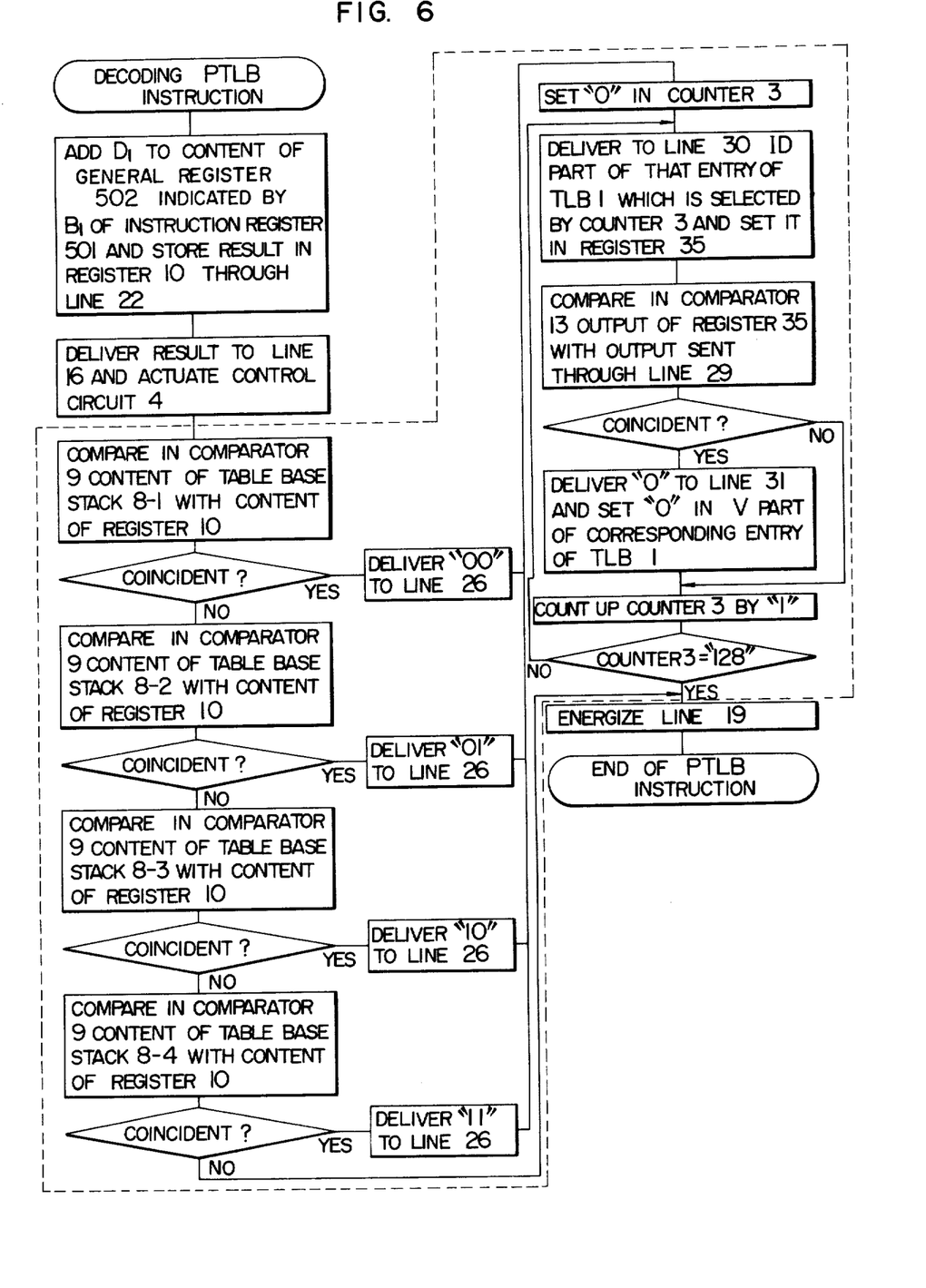
FIG. 6 is a flow chart illustrating the operation of the address translation system according to the present invention.

Now, the operation of purging entries in the TLB 1 shown in FIG. 3 will be described with the aid of a flow chart shown in FIG. 6. This purging operation is performed under the control of a microprogram in the control circuit 4.

First, the PTLB instruction read out of the MM through the line 21 is set in the instruction register 501. Then, the content of the general register 502 selected by the decoder 504 in accordance with the $B_1$ part of the instruction register 501 is added in the arithmetic unit 503 to the $D_1$ part of the same register 501 and the results is sent through the line 22 and set in the address register 10. The F and I parts of the instruction register 501 are sent through the line 511 to the instruction decoding circuit 506 so as to be identified as the PTLB instruction. When the combination of the F and I parts is identified to be a PTLB instruction, the instruction decoding circuit 506 delivers an output to the line 16, which activates the control circuit 4. The content of the address register 10 is sent through the line 23 and the gate 15 to the comparator 9, which compares the content with the base address that is read out of the register 8-1 of the table base stack 8 and corresponds to a virtual storage space. When they are coincident with each other, the stack number "OO" of the register 8-1 of the table base stack 8 is delivered to the line 26. If they are not coincident with each other, the content of the register 8-2 of the table base stack 8 is read out and sent to the comparator 9 so as to be compared with the content of the address register 10. If the compared contents are in coincidence, the stack number "01" of the register 8-2 of the table base stack 8 is delivered to the line 26. But if they do not coincide with each other, the content of the register 8-3 of the table base stack 8 is read out for comparison. In like manner, the comparison operation up to the register 8-4 is performed. If no coincidence is found even after the comparison of all the contents of the table base stack 8 has been completed, a line 19 is energized to finish the operation by the PTLB instruction. If there is a coincidence, the stack number of the register whose content contributed to the coincidence is sent through the line 26, the gate 14 and the line 29 to the comparator 13. At this time the counter 3 is set to have the initial value and the ID part of the first entry of the TLB 1 selected by the counter 3 and the decoder 2 is delivered to the line 30 and set in the register 35. The comparator 13 compares the output of the register 35 with the last stack number sent through the line 29. If the output coincides with the stack number, an output "O" is delivered to the line 31 so that the output "O" is written in the V part of the first entry and the address translation pair in the first entry is purged. After the address translation pair in the first entry has been purged or when the above mentioned output of the register 35 and the stack number sent through the line 29 are not coincident with each other, the value in the counter 3 is renewed so that the content of the ID part of the second entry is read out to be subjected to another similar comparison. The comparison operations are performed as many times as the number of the entries of the TLB 1 (in this embodiment 128 times) and when all the comparison operations have been completed, the line 19 is energized to finish the operation by the PTLB instruction. From the above description it is seen that in the TLB 1 only address translation pairs corresponding to a certain virtual storage space are purged.

Figure 5:
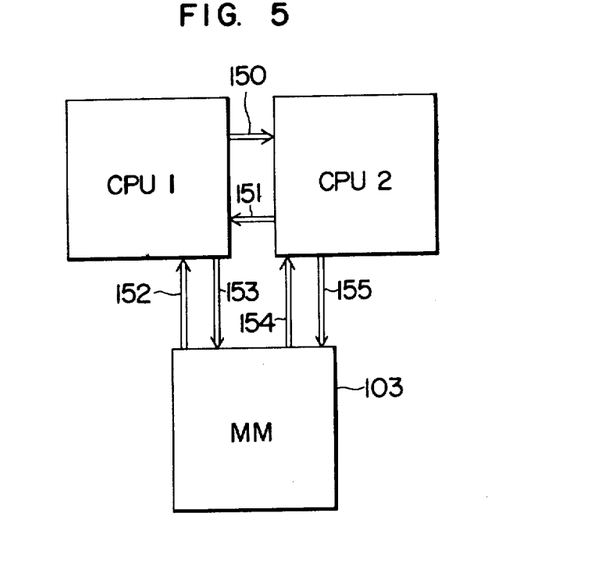
FIG. 5 shows in block diagram a multiprocessor system.

Next, the case will be described where the present invention is applied to a multiprocessor system. FIG. 5 shows the state of such an application where two central processing units CPU 1 and CPU 2 share main memory MM 103. Each of the CPU 1 and CPU 2 has such a structure as shown in FIG. 3. The number of the entries of the TLB 1 and the number of the registers of the table base stack 8 in each of the CPU 1 and CPU 2 may be varied from that of the system shown in FIG. 3 according to respective processing capabilities. The CPU 1 and CPU 2 are connected with each other by lines 150 and 151 (corresponding to the lines 41 and 42 in FIG. 3), which send back and forth the PTLB instruction and the completion of the PTLB instruction between the CPU's. It should here be noted that the CPU 1 and CPU 2 are so controlled from the standpoint of program constitution that the CPU 1 and the CPU 2 may not deliver the PTLB instructions simultaneously. Through lines 153 and 155 (corresponding to the line 20 in FIG. 3), the content of the address register 10 is written in the MM 103. Through lines 152 and 154 (corresponding to the line 21 in FIG. 3), the table base addresses or the instructions are read out from the MM 103.

DESCRIPTION OF OPERATION

Figure 7:
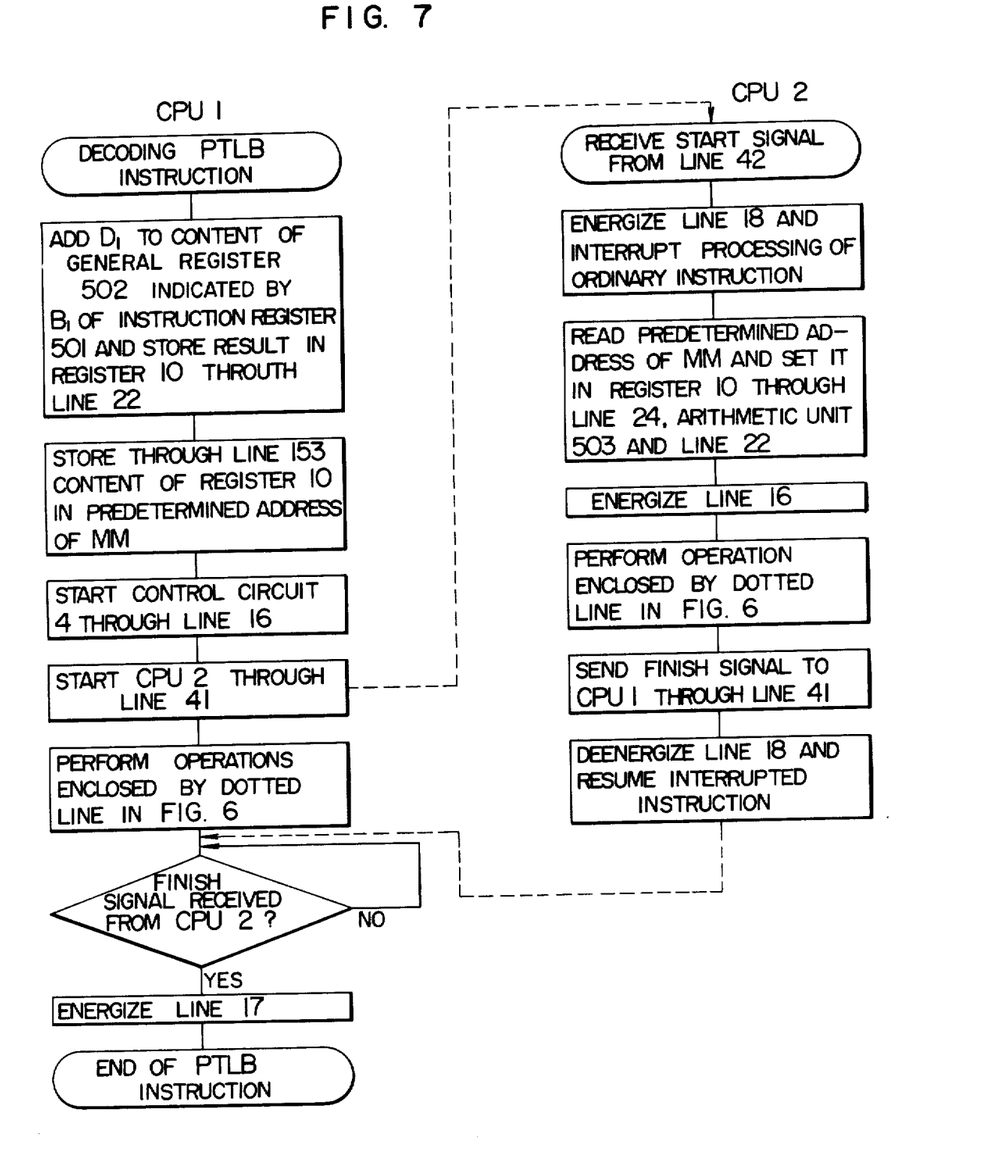
FIG. 7 is a flow chart illustrating the operation of the present invention applied to a multiprocessor.

With the aid of FIG. 7 is described an operation in which when an address translation pair corresponding to a certain virtual storage space is purged from the TLB of the CPU 1, the address translation pairs corresponding to the same virtual storage space are purged also from the TLB of the CPU 2. It is assumed for convenience sake that in each of CPU 1 and CPU 2 the table base stack 8 has four registers while the TLB 1 has 128 entries.

The PTLB instruction is read out of an address in the MM 103 and set in the instruction register 501 of the CPU 1. The content of the general register 502 which corresponds to the $B_1$ part of the instruction register 501, is added to the $D_1$ part of the instruction register 501 in the arithmetic unit 503 and the result is sent through the line 22 and stored in the address register 10. The content of the address register 10, i.e. operand address, is sent through the line 23, the arithmetic unit 503 and the line 20 (corresponding to the line 153 in FIG. 5) and stored in a predetermined address in the MM 103. The control circuit 4 is actuated through the line 16 and simultaneously the control circuit 4 of the CPU 2 also actuated through the line 41. Thereafter, in the CPU 1 the same operations as described with FIG. 6 will be performed.

Figure 3:
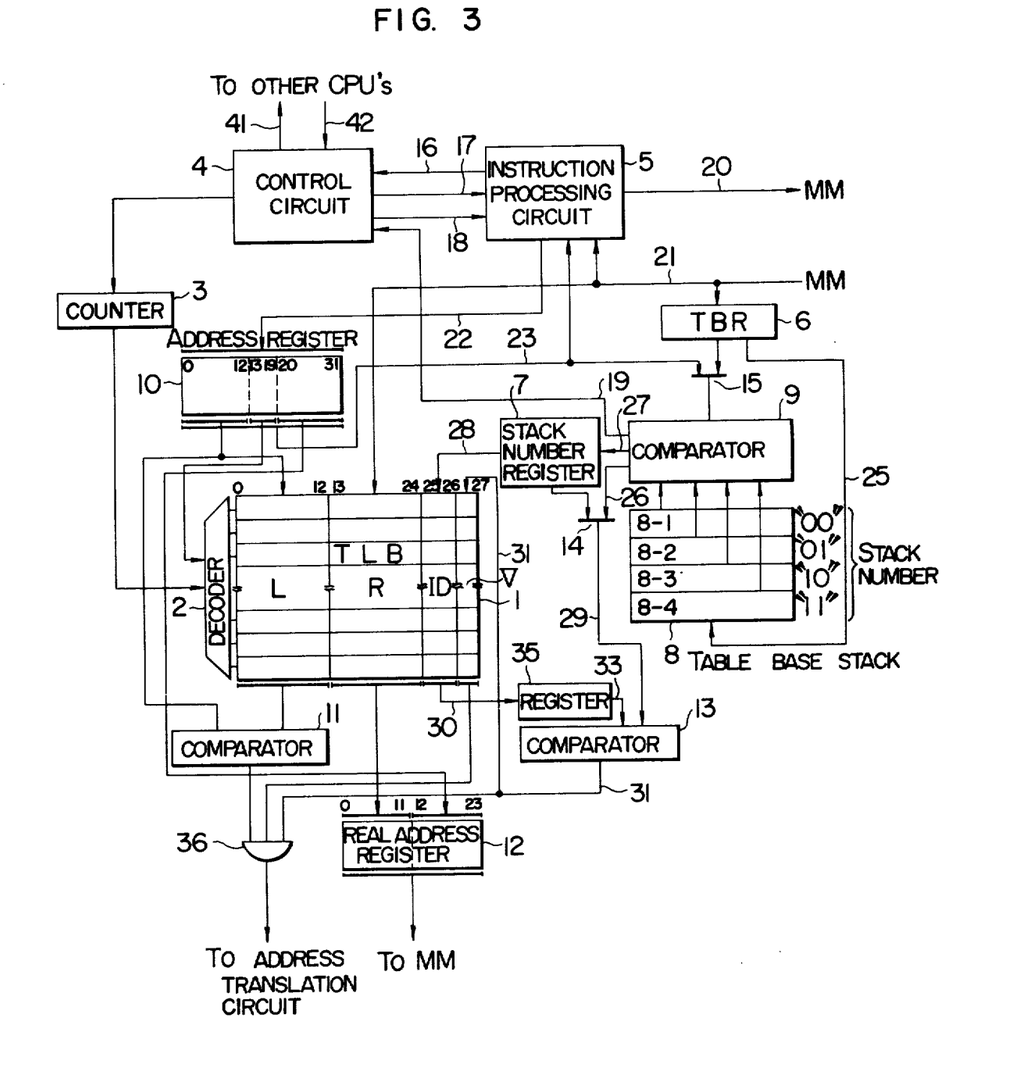
FIG. 3 shows in block diagram an embodiment of the present invention.

On the other hand, the CPU 2, assumed to have the circuit shown in FIG. 3, receives the starting signal through the line 42 and actuates the control circuit 4. So, the line 18 is energized to temporarily interrupt the processing operation performed by the CPU 2 according to the ordinary instruction. The operand address is read, through the line 154 (corresponding to the line 21 in FIG. 3), out of the predetermined address in the MM 103 in which the content of the address register 10 of the CPU 1 has been stored. The read operand address is then sent through the arithmetic unit 503 and the line 22 of the CPU 2 and set in the address register 10 of the CPU 2. Thereafter, the line 16 is energized to perform the series of operations enclosed by dotted line in FIG. 6. The description of these operations have already been made and is omitted here. In the CPU 2, when the performance of the PTLB instruction is completed, the finish signal is sent through the line 41 to the CPU 1. Then, the line 18 of the CPU 2 is deenergized and the instruction interrupted previously is now resumed.

The CPU 1, after having purged a part of the entries of the TLB 1, waits for the finish signal from the CPU 2. When the finish signal is delivered from the CPU 2, the control circuit 4 of the CPU 1 receives it so that the line 17 is energized to finish the operation according to the PTLB instruction. Thus, it is seen that when an address translation pair corresponding to a certain virtual storage space is purged from the TLB 1 of the CPU 1, the corresponding address translation pair is also purged from the TBL 1 of the CPU 2 and that both the purging operations are parallel performed. It is also easily understood that this way of operation can be applied to a case where more than two CPU's are used. For example, the flow charts each of which is similar to that for the CPU 2 can be added for additional CPU 3 and CPU 4 to the FIG. 7 and in such a case the CPU 1 sends the PTLB instruction to the CPU 2, 3 and 4 and receives the finish signal from all of them.

In the description of the preferred embodiments of the present invention, various parameters are evidently or implicitly evaluated, but it should be noted that the present invention is by no means limited to those formats described above. It should be also understood that the parts or circuit elements described above can be replaced by other suitable parts or elements without departing from the spirit and scope of the present invention.

The format of the instruction shown in FIG. 2 is one of the implicitly determined parameters. Especially, in the preferred embodiment, the PTLB instruction consisting of the operation code (F) and the variation (I) is "8104" in terms of hexadecimal representation, but other formats may be employed instead.

In a modified example of the present invention in which the table base stack 8 is in the form of a memory, the stack numbers proper to the registers 8-1, 8-2, . . . become the address for accessing the memory. In this case, the memory stores the base address corresponding to so many virtual storage spaces and the numbers for the identification of the base addresses are set in the ID parts of the entries of the TLB. Further, the address for searching the table stack memory 8 is decoded so that the base address are sequentially read out of the table stack memory 8 to be subjected to the comparison operation in the comparator 9. The procedure of searching the table base stack 8 need not start with the register 8-1, but has only to follow any well-known algorithm.

In the preferred embodiment shown in FIG. 3, the register 35 is provided to temporarily store the signal read out of the ID part of each entry of the TLB 1, but the variation of the present invention can do without the register 35. In such a case, the signal read out of the ID part of the entry of the TLB 1 is directly subjected to the comparison operation of the comparator 13.

Moreover, another modification of the present invention can be proposed in which the operand address of the instruction compared by the comparator 9 in FIG. 3 is not directly set in the address register 10, but the information on the MM corresponding to the operand address is set in the address register. Namely, the operand address is set in the address register 10 and the MM is then accessed with respect to the operand address so that the read-out content is again set in the address register 10. Thereafter, such a comparison operation as described above is performed. In such a case, the information represented indirectly by the operand address is subjected to the comparison by the comparator 9.

I claim:

1. An address translation system in which a real space is shared by a plurality of logical spaces, comprising:
   a table base stack having a plurality of storage units, each storage unit storing a base address characteristic of a different virtual space, and each of said storage units having an identification flag characteristic thereof;
   a translation lookaside buffer for registering address translation pairs each consisting of a virtual address and a real address, which buffer has with respect to said translation pairs the identification parts in which the identification flags characteristic of said storage units of said table base stack are set;
   an output means for searching said storage units of said table base stack by using as a key a base address of a virtual space to be invalidated when an instruction is issued for invalidating an address translation pair in said translation lookaside buffer and for delivering the identification flag of the storage unit in which the desired base address is stored;
   a comparison means for sequentially reading said identification flags out of said identification parts of said translation lookaside buffer and comparing the read-out flags with signals from said output means; and
   means for purging the address translation pair corresponding to the identification part when the identification flag thereof produces a coincidence in the comparison performed by said comparison means.

2. An address translation system as claimed in claim 1, wherein said table base stack comprises a plurality of registers and said identification flags are the numbers characteristic of said registers.

3. An address translation system as claimed in claim 1, wherein said table base stack comprises a memory for storing a plurality of base addresses and said identification flags are addresses of said memory in which said base addresses are stored.

4. An address translation system as claimed in claim 1, wherein said instruction for purging an address translation pair from said translation lookaside buffer is issued when a program processing is completed.

5. An address translation system in which a real space is shared by a plurality of logical spaces, comprising:
   a plurality of registers, each having a number characteristic thereof and each storing a base address of a different virtual space;
   a translation lookaside buffer for registering address translation pairs each consisting of a virtual address and a real address, which buffer has with respect to said translation pairs the identification parts in which the numbers characteristic of said registers are set;
   a first comparison means for comparing an address data represented by an operand address of an instruction with the base addresses read sequentially out of said registers, when the instruction is issued for invalidating an address translation pair in said translation lookaside buffer;
   an output means for delivering the number characteristic of the register which contributes to a coincidence in the comparison performed by said first comparison means;
   a second comparison means for comparing a signal from said output means with signals read sequentially out of the identification parts of said translation lookaside buffer; and
   means for purging only an address translation pair corresponding to the identification part which contributes to a coincidence in the comparison performed by said second comparison means.

6. An address translation system as claimed in claim 5, further comprising a means for finishing the operation of purging the address translation pairs in said translation lookaside buffer when no coincidence is found by said first comparison means.

7. An address translation system having a real spaced shared by plural logical spaces and employing multiprocessor system in which plural processors share a single main memory, comprising:
   a plurality of registers provided in each of said processors for storing the base addresses of different virtual spaces;
   a translation lookaside buffer provided in each of said processors for registering address translation pairs each consisting of a virtual address and a real address, which buffer has with respect to said translation pairs the identification parts in which the numbers characteristic of said registers are set;
   a first comparison means provided in each of said processors for comparing the address data represented by an operand address of an instruction with the base addresses read sequentially out of said registers;
   an output means provided in each of said processors for delivering the number of the register which contributes to a coincidence in the comparison performed by said first comparison means;
   a second comparison means provided in each of said processors for comparing a signal from said output means with signals read sequentially out of the identification parts of said translation lookaside buffer;
   means provided in each of said processors for purging only an address translation pair corresponding to the identification part which contributes to a coincidence in the comparison performed by said second comparison means;
   means for sending a purging instruction to the other processors when an address translation pair is purged from a translation lookaside buffer of one processor;
   means for applying to said first comparison means of said one processor an address data represented by an operand address of an instruction used in said one processor;
   means for storing said address data in a specified address in said main memory; and
   means for reading said address data out of said specified address of said main memory by said other processors and for applying the read address data to said first comparison means.

8. An address translation system as claimed in claim 7, wherein said one processor further comprises means for waiting until the termination of the purging operation in translation lookaside buffers of said other processors before resuming the processing of a program.

9. An address translation system as claimed in claim 7, wherein said purging instruction is read out of said main memory when the processing of a program is completed in one processor.

* * * * *